(12) United States Patent
Bukowski et al.

(10) Patent No.: US 6,604,068 B1
(45) Date of Patent: Aug. 5, 2003

(54) SYSTEM AND METHOD FOR CONCURRENTLY MODELING ANY ELEMENT OF A MODEL

(75) Inventors: Richard William Bukowski, Berkeley, CA (US); Mark Damon Wheeler, Oakland, CA (US)

(73) Assignee: Cyra Technologies, Inc., San Ramon, CA (US)

( * ) Notice: Subject to any disclaimer, the term of this patent is extended or adjusted under 35 U.S.C. 154(b) by 0 days.

(21) Appl. No.: 09/574,672

(22) Filed: May 18, 2000

(51) Int. Cl.$^7$ ................................. G06F 9/30
(52) U.S. Cl. ................... 703/22; 703/2; 707/8; 707/514; 711/168
(58) Field of Search ............ 703/2, 22; 707/8, 707/2, 4, 10, 514; 711/168; 345/133

(56) References Cited

U.S. PATENT DOCUMENTS

| | | | | |
|---|---|---|---|---|
| 5,220,657 A | * | 6/1993 | Bly et al. ................... 395/425 |
| 5,333,316 A | | 7/1994 | Champagne et al. ....... 395/600 |
| 5,732,192 A | * | 3/1998 | Malin et al. .................. 395/10 |
| 5,757,669 A | * | 5/1998 | Christie et al. ......... 364/514.06 |
| 5,815,415 A | * | 9/1998 | Bentley et al. ............. 364/578 |
| 5,899,997 A | * | 5/1999 | Ellacott ..................... 707/103 |
| 5,937,194 A | * | 8/1999 | Sundaresan ................. 395/705 |
| 5,966,707 A | * | 10/1999 | Van Huben et al. .......... 707/10 |
| 6,023,326 A | | 2/2000 | Katayama et al. ....... 356/141.3 |
| 6,026,401 A | * | 2/2000 | Brealey et al. ................ 707/8 |
| 6,048,105 A | | 4/2000 | Ohtomo et al. ............... 385/88 |
| 6,052,181 A | | 4/2000 | Maynard et al. ............ 356/147 |
| 6,246,468 B1 | * | 6/2001 | Dimsdale ................... 356/4.02 |

FOREIGN PATENT DOCUMENTS

GB  2 258 745 A  2/1993 ........... G06F/15/60

OTHER PUBLICATIONS

*A Technical Leap In Robotic Programming May Be On The Horizon*; by Andrew Cullison; Welding Journal, Jul. 1998; pp. 49–52.
*Rapid Laser Scanner Heralds New Advance In Terrestrial Survey*; Engineering Surveying Showcase; Apr. '99, p. 16.
*Product Bulletin*; Cyra Technologies, Inc. May 18, 1999, 6 pages.
*New Equipment, Supplies and Services*; Cyra Technologies Inc. Point Of Beginning (POB) Magazine; Dec. 1998, p. 66.
*Products, People, Places; 3D Laser Mapping System*; Professional Surveyor Magazine; Nov./Dec. 1998, p. 62.

(List continued on next page.)

*Primary Examiner*—Samuel Broda
*Assistant Examiner*—Thai Phan
(74) *Attorney, Agent, or Firm*—Stallman & Pollock LLP (57) ABSTRACT

A system and method are described for concurrently modeling of any element of a geometric model. The geometric model is stored in a database as a number of model objects. The model objects are loaded into a computer, and are then used to generate a display. When a model is edited, a representation of the model object is changed. The change is sent to the database to update the corresponding model object stored in the database. Any computers displaying this model will be notified of the change and will reload and redisplay the updated model object.

27 Claims, 8 Drawing Sheets

OTHER PUBLICATIONS

*Products, 3–D Laser Mapping System*; New Equipment Digest; Nov. 1998, p. 76.

*Front Page, Laser & Optronics; Laser Profiling Package*; Oct. 1998, p. 1.

*Literature & Products, Imaging System*; Power Engineering Magazine, Oct. 1998, p. 72.

*Showcase, 3–D Laser Mapping*; GPS World Magazine, Dec. 1998 Issue, vol. 9; p. 48.

A/E/C '98; *Expanding Horizons, Bold Initiatives, An Overview Of A/E/C Systems '98*; Microstation Manager, Aug. 1998; pp. 40–43.

*Cyrax 3D Laser Scanner: Computer Aided Construction*; Cyra 3D Digital Reality; May 21, 1999, One page.

*Cyrax Laser Scanning: Fabrication; Parts Mating Analysis*; Cyra 3D Digital Reality; May 21, 1999, One page.

*Cyrax 3D Laser Scanner: High Accuracy, Long Range, Data Capture*; Cyrax System Overview; Cyra 3D Digital Reality, May 21, 1999, pp. 1–3.

Cyrax 2400 Mark 1 3D Laser Scanner; Cyrax 2400, Cyra 3D Digital Reality, May 21, 1999, pp. 1–2.

*Cyrax: Long range 3D Laser Scanner; Cyrax 2400 Spec.*; Cyra 3D Digital Reality, May 21, 1999, pp. 1–3.

Cyrax 3D Software: Automatic 2D Extraction; Cyra 3D Digital Reality, One page.

New 3D Scanner Zaps Sci–Fi Movie Set; Professional Surveyor, New Technology, Apr. 1999, pp. 5 pages.

U.S. patent application Ser. No. 60/143,695, filed Jul. 14, 1999.

U.S. patent application Ser. No. 09/177,913, filed Oct. 23, 1998.

A. Takahara, "Versioning and Concurrency Control in a Distributed Design Environment," 1992 IEEE International Conference on Computer Design: VLSI in Computers & Processors, Oct. 11–14, *IEEE Comp. Soc. Press, US*, Oct. 11, 1992, pp. 540–543.

H.C. Du et al., "A Framework for Efficient IC/VLSI CAD Databases," Proceedings of the International Conference on Data Engineering, Los Angeles, Feb. 3–5, 1987, *IEEE Comp. Soc. Press, US,* vol. Conf. 3, Feb. 3, 1987, pp. 619–625.

J. Sun et al., "Transaction Management in Multi–User CAD Environment," (TENCON) Beijing, Oct. 19–21, 1993, New York, *IEEE, US,* vol. 1, Oct. 19, 1993, ppg. 589–591.

* cited by examiner

SYSTEM AND METHOD FOR CONCURRENTLY MODELING ANY ELEMENT OF A MODEL

BACKGROUND OF THE INVENTION

1. Field of the Invention

The present invention relates to a system and method for geometric modeling and, more particularly, to a system and method for concurrently modeling any element of a geometric model.

2. Description of the Related Art

Historically, geometric modeling tasks are performed by computer and by pencil-and-paper draftsmen in much the same way. That is, a task is allocated to a single operator who performs a large quantity of work (i.e., producing a drawing or a computer-aided-design (CAD) model file from a description or schematic) before any other operators can access the model being built (for editing, correction, evaluation, or any other process).

This technique is inherently sequential, and makes it difficult to put more operators on a task. Unless the models can be broken up into complete, discrete units, a model can only have a single operator working on it at once. If it were possible to have several operators at several workstations concurrently editing a single model, it would become possible to place more than one operator on a given modeling task. Putting multiple operators to work on the same task provides benefits in speed of model construction and error identification and correction (because inspectors and other modelers can observe and correct work in progress).

Two major factors that have historically prevented concurrent modeling are resource contention and the distribution of the model. To perform concurrent modeling efficiently, a structure is necessary that prevents different operators from "stepping on each other's toes" as they work on portions of the same model. Furthermore, the model must be rapidly accessible from two complete modeling workstations at once, or the operators will be getting in each other's way physically as well as within the model itself.

Networked computer CAD and modeling systems provide the technology base through which resource contentions between users can be managed. For example, in the CAD world, some degree of concurrent modeling is achieved by allowing different users to operate independently on different layers of a single CAD file.

This fits the definition of concurrent modeling, but the scale of parallelism is extremely coarse. Operating on different layers is barely better than simply assigning one view to each of a set of draftsmen. This is because each operator is essentially operating independently in an arbitrarily cordoned-off section of the model, and that partition of the model cannot be dynamically changed or redone to establish new boundaries as necessary.

Furthermore, updates are not dynamic, but are handled on explicit request. As a result, much of the aforementioned error correction capability is removed, since other operators will rarely see the product of a given operator until the latter is basically finished with their work. Thus, there is a need for a system and method that allows any element of a model to be concurrently modeled.

SUMMARY OF THE INVENTION

The present invention provides a system and method for concurrently modeling any element of a model. The system includes a first computer that has a database, and a second computer that is connected to the first computer. The database has a number of objects that define a model. The objects include index objects and model objects.

The first computer includes means for detecting an update instruction, and updating an object stored in the database in response to the update instruction. In addition, the first computer includes means for outputting a notification to the second computer that the database has been updated.

The second computer includes means for loading a number of objects from the database into the second computer to form a corresponding number of local objects. The local objects include local index objects and local model objects. The second computer further includes means for constructing a plurality of visual representations from the local model objects. Each visual representation is constructed from a corresponding local model object. Means for displaying a selected view of the model on a display are also included in the second computer. The selected view includes a number of visual representations.

In addition, the second computer includes means for editing a visual representation of a local object to define a change to the local object. The means includes means for editing a visual representation of a local model object to define a change to the local model object. The second computer further includes means for instructing the first computer to update the object stored in the database that corresponds with the local object that was edited to form an updated object in the database that reflects the change made to the local object. The means includes means for instructing the first computer to update the model object stored in the database that corresponds with the local model object that was edited to form an updated model object in the database that reflects the change made to the local model object.

The second computer also includes means for loading into the second computer the updated object to form an updated local object in response to the update notification. The means includes means for loading into the second computer the updated model object to form an updated local model object in response to the update notification. Further, means for constructing a visual representation from the updated local model object to form a reconstructed visual representation are included in the second computer. In addition, the second computer includes means for redisplaying the selected view of the model on the display as a redisplayed view. The redisplayed view includes the reconstructed visual representation.

The method of the present invention includes the step of loading a number of (index and model) objects from the database into the second computer to form a corresponding number of local objects, the local objects including local index objects and local model objects. In addition, the present invention includes the step of constructing a plurality of visual representations from the local model objects where each visual representation is constructed from a corresponding local model object. Further, the step of displaying a selected view of the model on a display is also included. The selected view includes a number of visual representations.

The method of the present invention additionally includes the step of editing a visual representation of a local object to define a change to the local object. The step includes the step of editing a visual representation of a local model object to define a change to the local model object.

Further, the method includes the step of instructing the first computer to update the object stored in the database that corresponds with the local object that was edited to form an updated object in the database that reflects the change made to the local object. The step includes the step of instructing the first computer to update the object stored in the database that corresponds with the local object that was edited to form an updated object in the database that reflects the change made to the local object.

The step of loading into the second computer the updated object to form an updated local object in response to an update notification is also included. The step includes the step of loading into the second computer the updated object to form an updated local object in response to the update notification.

The method further includes the steps of constructing a visual representation from the updated local model object to form a reconstructed visual representation, and redisplaying the selected view of the model on the display as a redisplayed view, the redisplayed view including the reconstructed visual representation.

A better understanding of the features and advantages of the present invention will be obtained by reference to the following detailed description and accompanying drawings that set forth an illustrative embodiment in which the principles of the invention are utilized.

DETAILED DESCRIPTION

Figure 1:
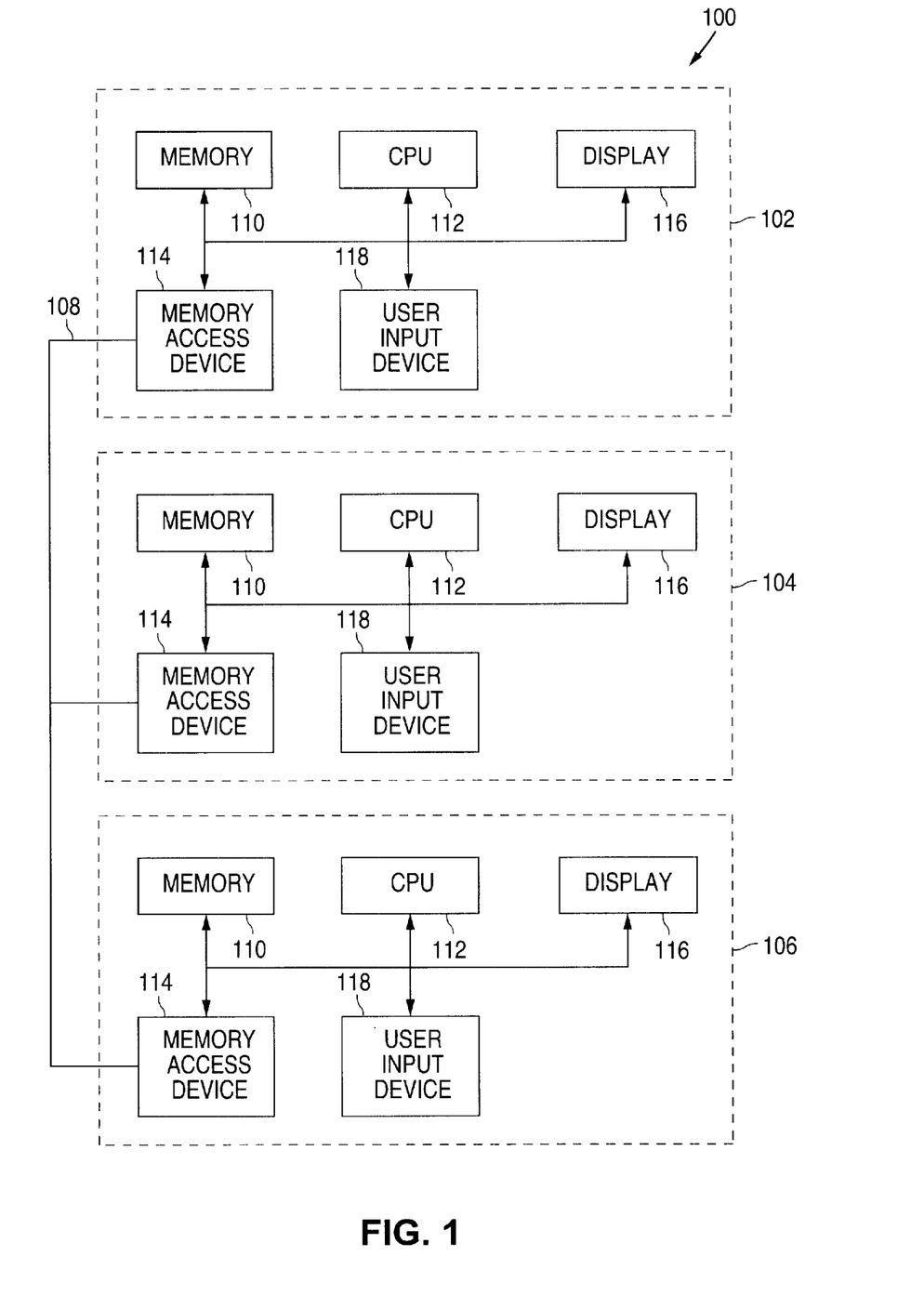
FIG. 1 is a block-diagram illustrating a system 100 in accordance with the present invention.

The present invention is directed to a system and method that gives an arbitrary number of users the ability to concurrently model in the same space while viewing the geometric model being edited. FIG. 1 shows a block-diagram that illustrates a system 100 in accordance with the present invention.

As shown in FIG. 1, system 100 includes a first computer 102, a second computer 104, a database computer 106, and a transmission line 108 connected to computers 102, 104, and 106. Computers 102, 104, and 106 exchange information over transmission line 108 via a conventional network protocol.

As further shown in FIG. 1, computers 102, 104, and 106 each have a memory 110. Memories 110 of computers 102 and 104 store program instructions and modeling data, while memory 110 of computer 106 stores program instructions and a model database. The model database includes a number of models. Each model, in turn, has a number of model objects which are organized using spatial and/or semantic indexes.

Index objects are commonly used by those familiar with the art to organize model objects so that the entire set of model objects can be efficiently searched and queried. Index objects include spatial and semantic index objects. Spatial index objects organize the model objects based on their spatial position while semantic index objects organize model objects based on other (possibly user defined) properties on the model objects.

In the simplest embodiment, the database would include a single index object which simply referenced a list of all the model objects. A more efficient embodiment would contain a sorted tree of index objects which allow fast lookups (using spatial or semantic criteria) for particular model objects. In addition, the model database supports per-object locking, transaction-based modifications, and per-object notification.

(Alternately, the model database can be stored in computer 102.)

As further shown in FIG. 1, computers 102, 104, and 106 each include a central processing unit (CPU) 112 connected to memory 110 that executes the program instructions. Further, computers 102, 104, and 106 each include a networking device 114 connected to transmission line 108, memory 110, and CPU 112 that supports the network protocol.

In addition, computers 102, 104, and 106 each include a display system 116 that is connected to CPU 112. Display system 116 displays images to the user which are necessary for the user to interact with the program. Further, computers 102, 104, and 106 each include a user-input device 118, such as a keyboard and a pointing device, which is connected to CPU 112. The user operates input device 118 to interact with the program.

Figure 2A:
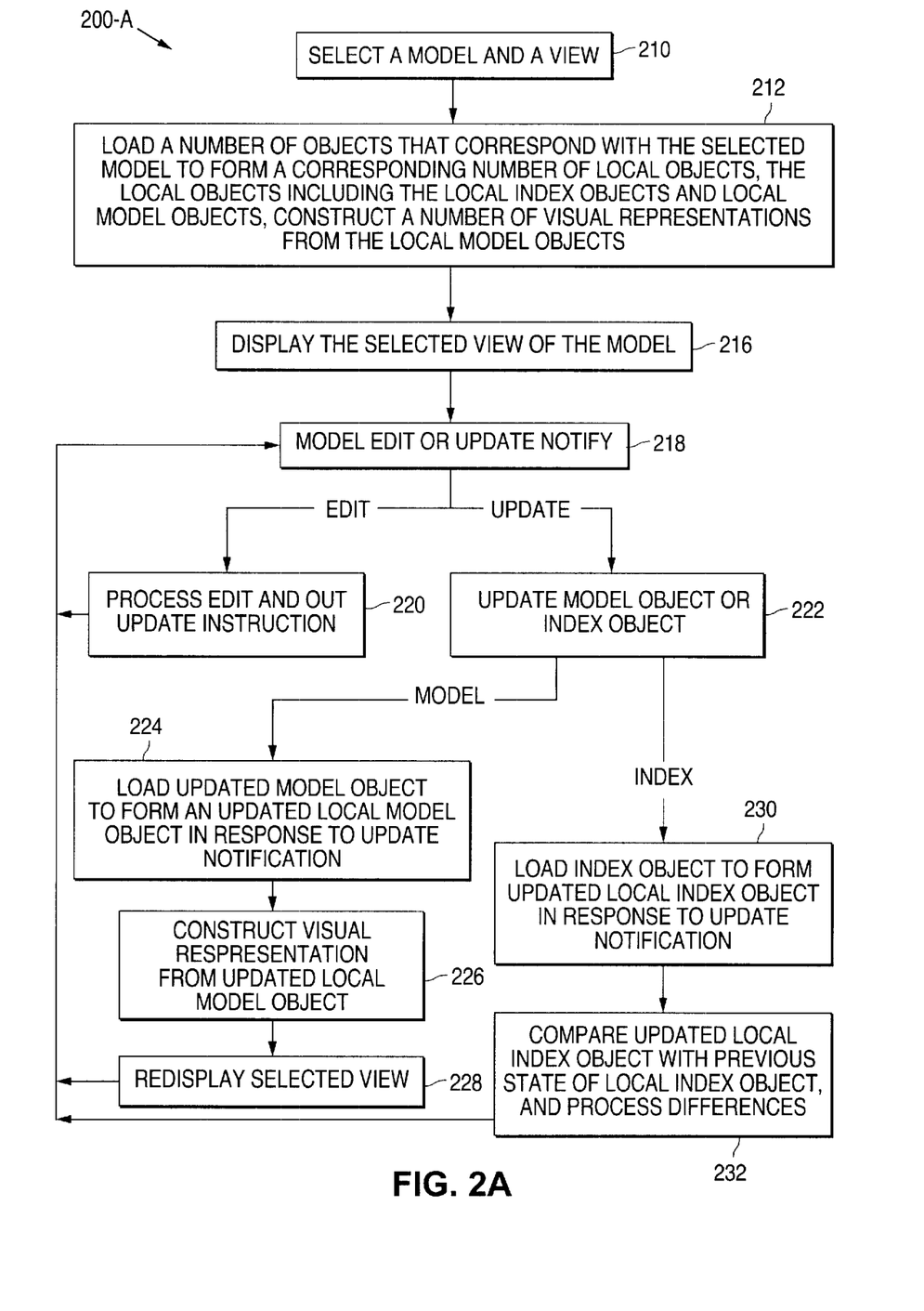
FIGS. 2A and 2B are flow charts illustrating methods 200-A and 200B, respectively, for concurrently modeling any element of a model in accordance with the present invention.
Figure 2B:
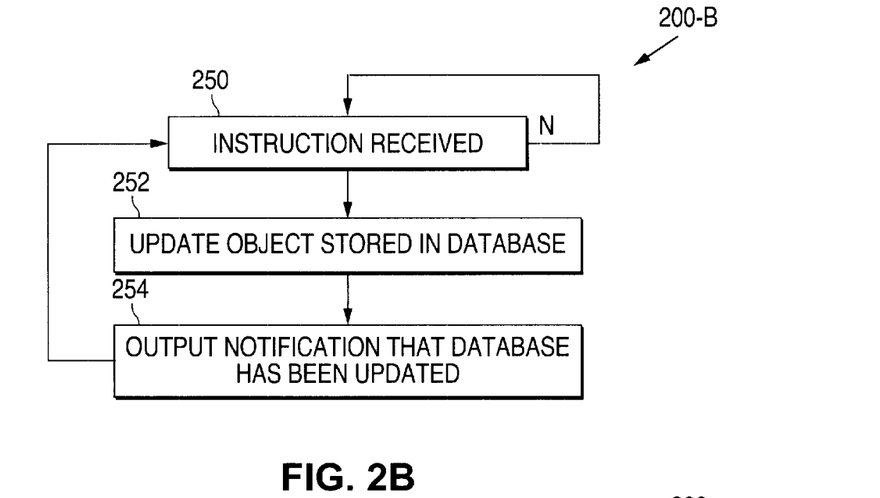

FIGS. 2A and 2B show flow charts that illustrate methods 200-A and 200B, respectively, for concurrently modeling any element of a model in accordance with the present invention. Method 200-A is implemented in software that is programmed into computers 102 and 104, while method 200-B is implemented in software that is programmed into computer 106. (Although no issue of concurrency is present, method 200-A can alternately be programmed into only one of the computers 102 or 104.)

To begin a modeling session on computer 102, as shown in step 210 of FIG. 2A, a user must select a model to work on, and either a default view or a stored view. With the default view, the user can comfortably see the whole model within the displayed image. The stored view, on the other hand, can be any of the possible views, such as a small portion of one part of the model, which the user has elected to store in memory.

When a model and a view have been selected, method 200-A moves to step 212 where computer 102 loads a number of the objects that correspond with the selected model from the database to form a corresponding number of local objects. The local objects include local index objects and local model objects. The index objects of interest (based on the particular view) are loaded and these index objects reference other index and model objects which are then scheduled to be loaded. In addition, computer 102 constructs a number of visual representations from the local model objects.

Next, method 200-A moves to step 216 where, using a number of the visual representations, computer 102 displays a selected view of the model on display 116. After the selected view has been displayed, method 200-A moves to step 218 to wait for a user to edit the view, or for an update message to be received. (Editing the view includes adding or deleting a model or index object within a model.)

When a user edits the view, the user edits a visual representation of a local model object to define a change to the local model object. After the local model object has been edited, method 200-A moves to step 220, where computer 102 processes the edit and outputs an update instruction to computer 106, and then back to step 218. Computer 106 is instructed to update the model object stored in the database that corresponds with the local model object that was edited to form an updated model object in the database that reflects the change made to the local model object.

On the other hand, when an update notification is received from computer 106, method 200-A moves from step 218 to step 222 where computer 102 checks whether the update is for a model object or an index object. If the updated object is a model object, computer 102 moves to step 224 where computer 102 loads the updated model object to form an updated local model object in response to the notification from computer 106.

After this, method 200-A moves to step 226 where computer 102 constructs a visual representation from the updated local model object to form a reconstructed visual representation. Method 200-A then moves to step 228 where computer 102 redisplays the selected view of the model on the display as a redisplayed view. The redisplayed view includes the reconstructed visual representation. After this, method 200-A moves back to step 218 to wait for a user to again edit the view.

If the updated object in step 222 is an index object, computer 102 moves to step 230 where computer 102 loads the updated index object to form an updated local index object in response to the notification from computer 106. Next, method 200-A moves to step 232 to compare the updated local index object with the previous state of the local index object, and process the differences, e.g., update index objects to reflect changes to the model objects referenced by the updated index objects.

The method handles cases of introducing newly created model objects and removing deleted model objects by checking for changes in the set of referenced model and index objects when updating the local copy of index objects. Newly referenced objects are added to the list of objects to load. Deleted objects are removed from memory and their visual representation is removed. Following this, method 200-A moves back to step 218.

Method 200-B, in turn, illustrates the operation of database computer 106. As shown in FIG. 2B, method 200-B begins at step 250 where computer 106 waits to receive an update instruction. When an update instruction is received, method 200-B moves to step 252 where computer 106 updates an object stored in the database. After this, method 200-B moves to step 254 where computer 106 outputs an update notification that the database has been updated. Once the update notification has been output, method 200-B moves back to step 250 to wait for the next instruction.

Thus, in the present invention, the viewing and editing are done on the object level (rather than, for example, on the layer level). When a user on computer 102 edits an object, the object in the database is updated, and then the view on computer 102 is updated. As a result, a user on computer 102 and a user on computer 104 can model in the same space, on objects that are right next to each other, without interfering with each other's work. In fact, users on two or more computers can collaboratively edit the same object in an incremental fashion, each immediately seeing the previous update to the model object made by the other user.

As noted above, to begin a modeling session, a user must select a model from the model database to work on. In the model database, the object that defines the starting point, or directory, for one complete model is known as a root index object. The root index object refers to a number of index structures formed from indexing objects which, in turn, refer to a single set of model objects that, taken as a group, form the geometry of the model.

For example, a root index object that defines a model of a petroleum storage facility includes a semantic index structure and a spatial index structure, as well as a number of model objects that define all the individual, tiny parts of the tanks. All of the model objects that form, for example, a cylindrical storage tank can be grouped together to form a first index object in the semantic index, while all of the model objects that form a spherical storage tank can be grouped together to form a second index object in the semantic index.

In addition, all of the model objects that form a top surface of the cylindrical storage tank can be grouped together to form a third index object in the semantic index which is referred to by the first index object in the semantic index, because the third index object indexes a subpart of the structure indexed by the first index object. Similarly, all of the model objects that form a side wall surface of the cylindrical storage tank can be grouped together to form a fourth index object which is also referred to by the first index object (again, because it is a subpart of the part referred to by the first index object). This semantic partitioning can continue to whatever level is necessary to provide the needed level of modeling detail.

Furthermore, a spatial index structure can be used to partition the set of model objects by physical location in space, rather than purpose in the structure. For example, the spatial index would contain a first index object referring to the whole tank, and the further index objects that form parts of that tank would form the upper part of the tank, the lower part of the tank, the left side of the tank, or the right side of the tank.

Each indexing object, which refers to other indexing objects that form subparts of that indexing object as well as model objects, stores a small piece of reference information about each object it refers to. This piece of reference information is dependent on the type of index; for example, the index objects in the spatial index structure contain a bounding box for each reference, which describes the rough spatial location of the object or indexed object set to which the reference points.

To select a model to work on, the user selects the desired root index object, and a view of the model. The selection of the root index object and the view initializes method 200-A to generate a displayed image. The image begins empty (i.e. devoid of any visual representations), and is rapidly constructed incrementally over time as the various threads that form the method load and construct visual representations of the objects in the view. The user can then wait until method 200-A outputs a completed image of the model via display system 116, or can at any time select one of the model objects which has been processed sufficiently to have a visual representation in the current displayed image.

Figure 3:
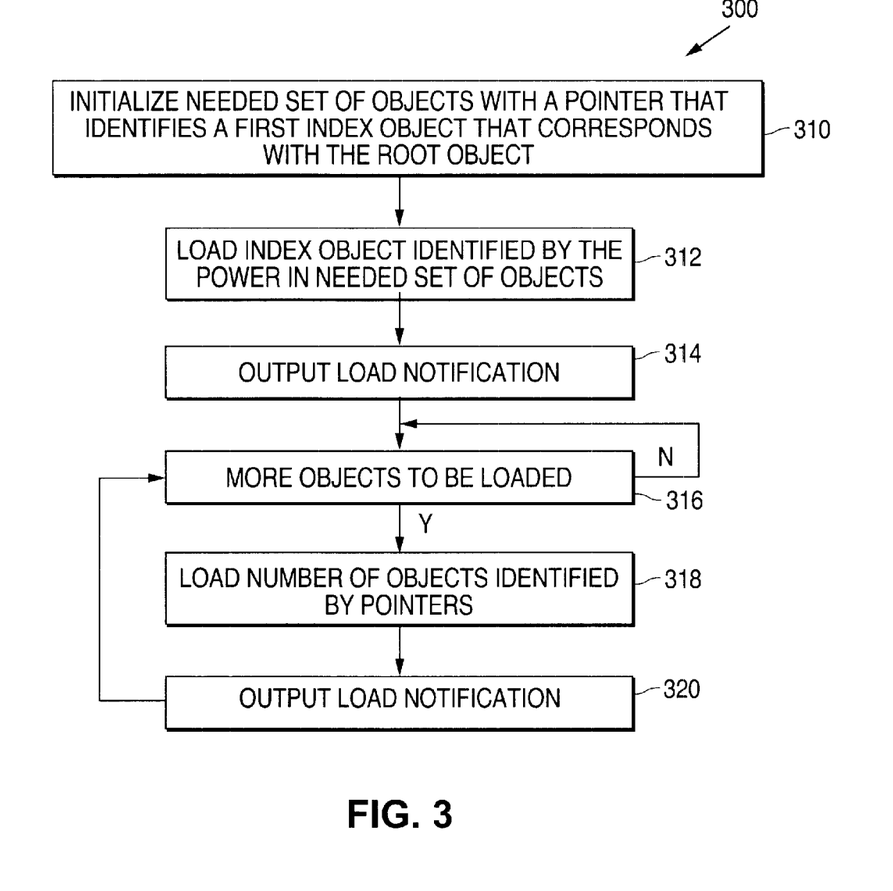
FIG. 3 is a flow chart illustrating a load thread 300 in accordance with the present invention.

Method 200-A utilizes three interrelated threads, a load thread, a model thread, and a render thread, to generate the displayed image. FIG. 3 shows a flow chart that illustrates a load thread 300 in accordance with the present invention. Load thread 300 implements a portion of step 212 of method 200-A.

As shown in FIG. 3, load thread 300 begins at step 310 where a needed set of objects is initialized with a pointer that identifies a first index object of one of the index structures of the selected root index object. Following this, load thread 300 moves to step 312 to load the first index object identified by the pointer in the needed set of objects. The first index object is loaded into computer 102 from the model database as a local copy of the first index object. Once the first index object is loaded into computer 102, the pointer for the object is removed from the needed set of objects. Thus, after the first index object has been loaded into computer 102, the needed set of objects is again empty.

Once the index object has been loaded, load thread 300 moves to step 314 to output a load notification which indicates that an object has been loaded. After this, load thread 300 moves to step 316 to determine if there are more model or index objects to be loaded. The set of model or index objects that need to be loaded next is the set of objects referred to by the index object, minus any objects that are determined to be not of interest based on the view provided in the initialization phase plus the additional reference information attached to the references in the index object.

For example, if the view specifies that we are looking at the left side of the cylindrical tank, the first index object refers to the four index objects for the left, right, bottom, and top of the tank, the set of needed objects will be appended with the index object referring to the left side of the tank (which is in the view), but not with the index objects for the top, bottom, or left of the tank (which are not in the view). Model objects usually do not refer to other objects to be loaded, but they do result in visual representations being added to the displayed image. When the needed set of objects is empty, there are no more objects to be loaded and load thread 300 waits for additional pointers to be added to the needed set of objects.

When additional pointers are added to the needed set of objects, load thread 300 moves to step 318 to load a number of the objects that are identified by the pointers added to the needed set of objects. As above, the objects are loaded into computer 102 from the model database as local copies of the objects. After the objects have been loaded into computer 102, the pointers for the objects are removed from the needed set of objects.

Following this, load thread 300 moves to step 320 to output a load notification to indicate that a number of objects have been loaded. After this, load thread 300 moves back to step 316 to determine if additional objects remain to be loaded, in the case that the objects that were just loaded were index objects. Depending on the number of pointers that were added to the needed set of objects, load thread 300 may need to loop through steps 316–320 several times to load all of the model and index objects that are defined by the pointers.

One of the advantages of a separate load thread is that a load thread allows a large number of objects, known as a batch, to be loaded each time computers 102 and 104 access the model database. When the model database is truly remote, i.e., is on a different computer that is accessed over a network, batch loading provides a large speedup in database access.

As noted above, method 200-A utilizes three interrelated threads, a load thread, a model thread, and a render thread, to generate the view. FIGS. 4A–4F show a flow chart that illustrates a model thread 400 in accordance with the present invention. Model thread 400 also implements a portion of step 212 of method 200-A.

Figure 4A:
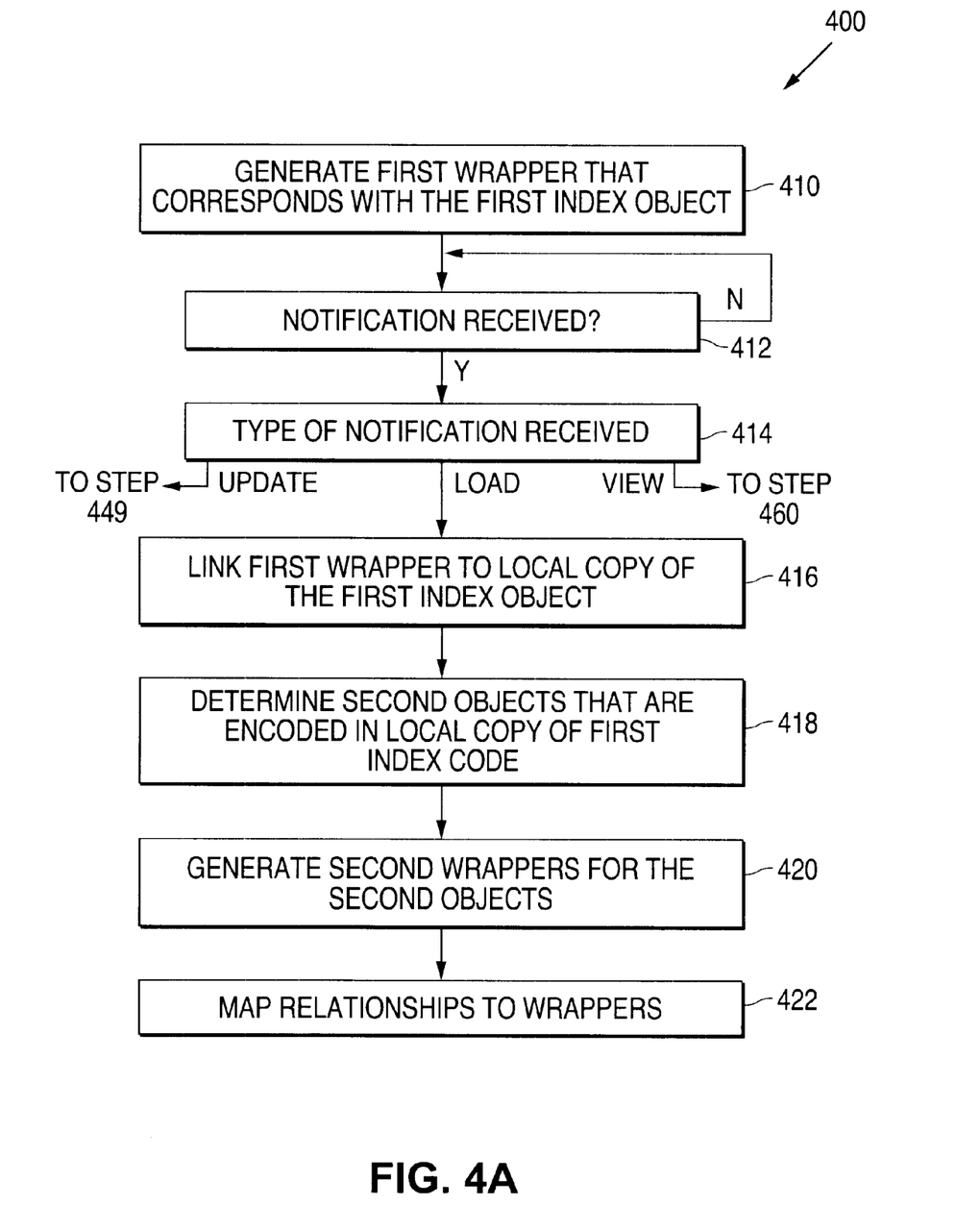
FIGS. 4A–4F are flow charts illustrating a model thread 400 in accordance with the present invention.
Figure 4B:
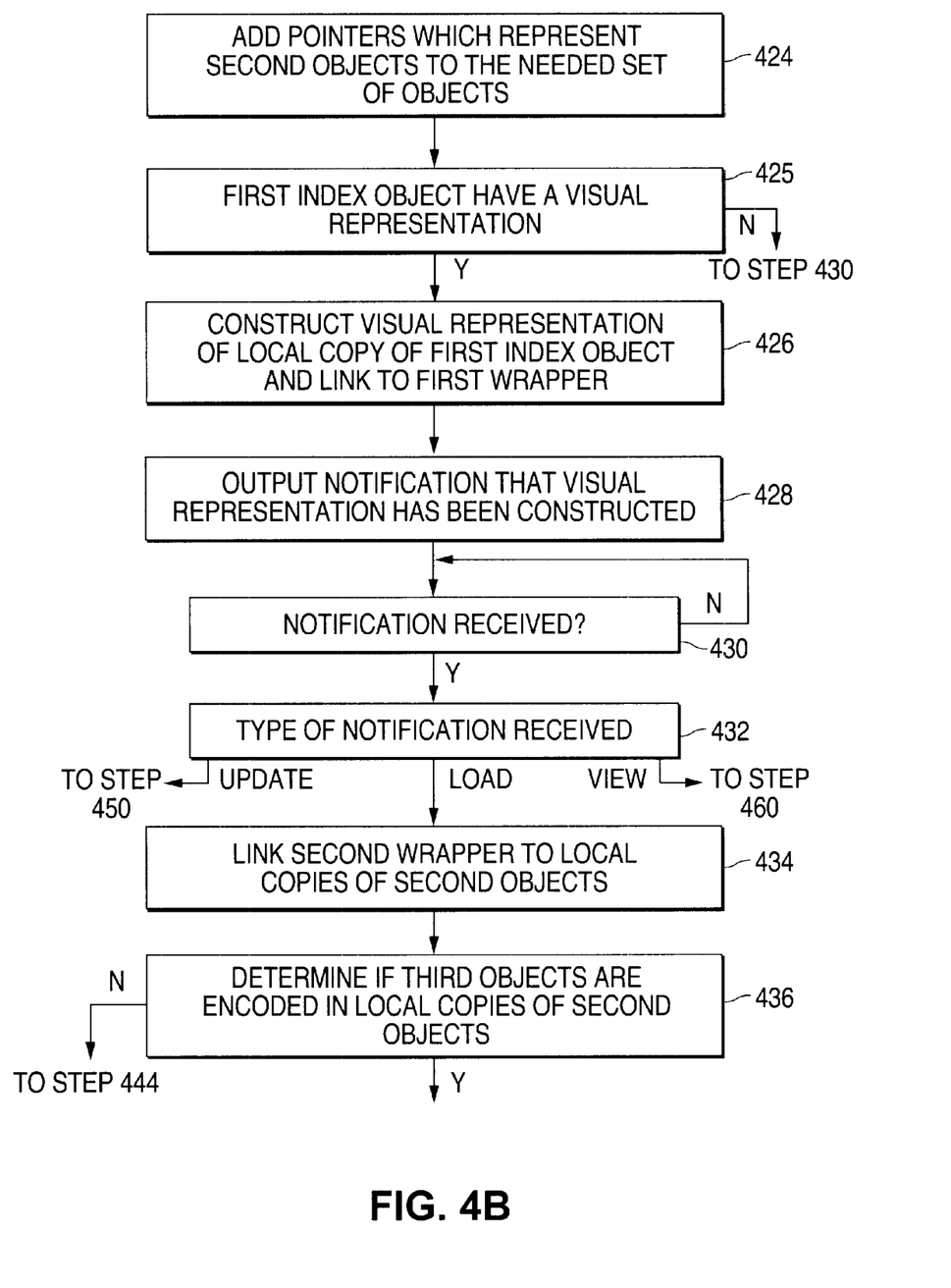
Figure 4C:
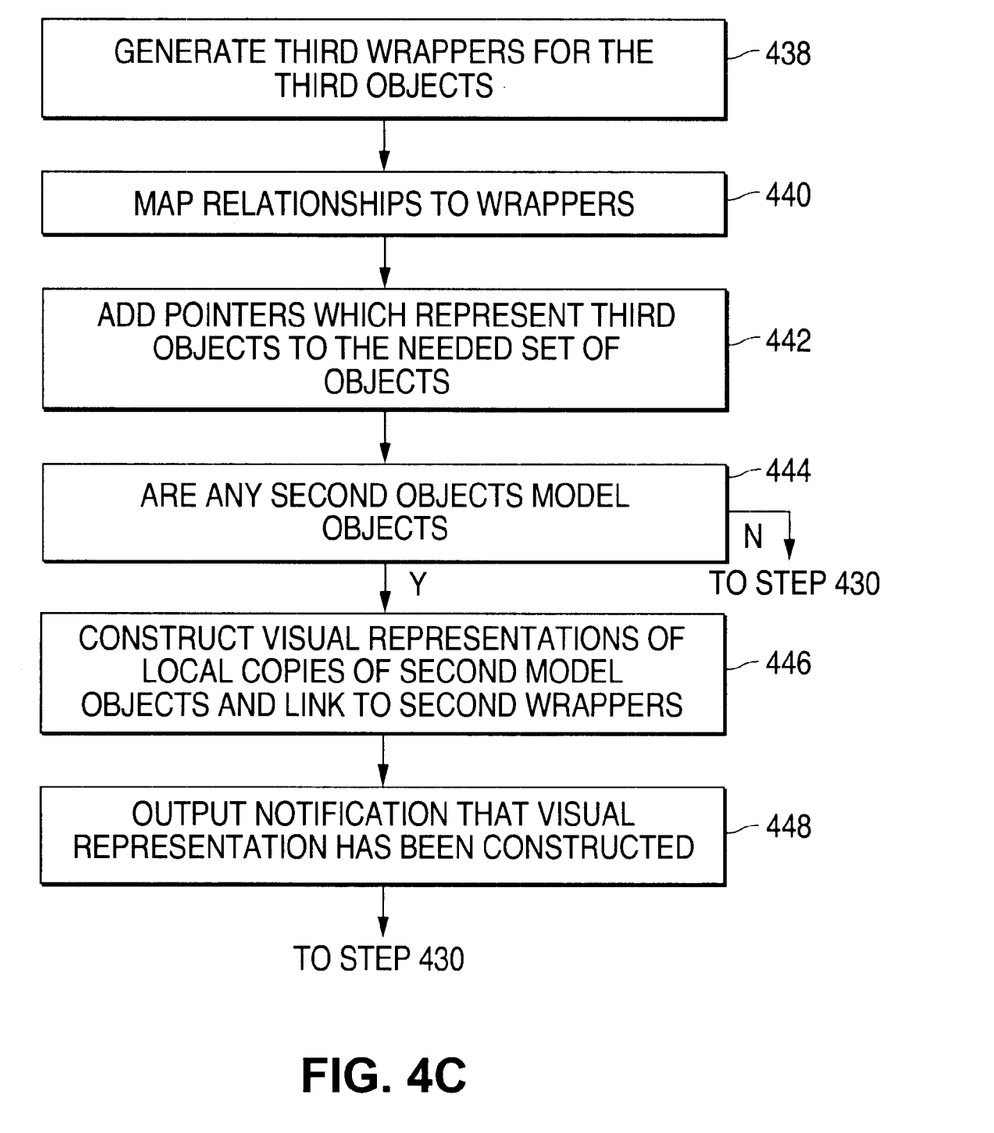
Figure 4D:
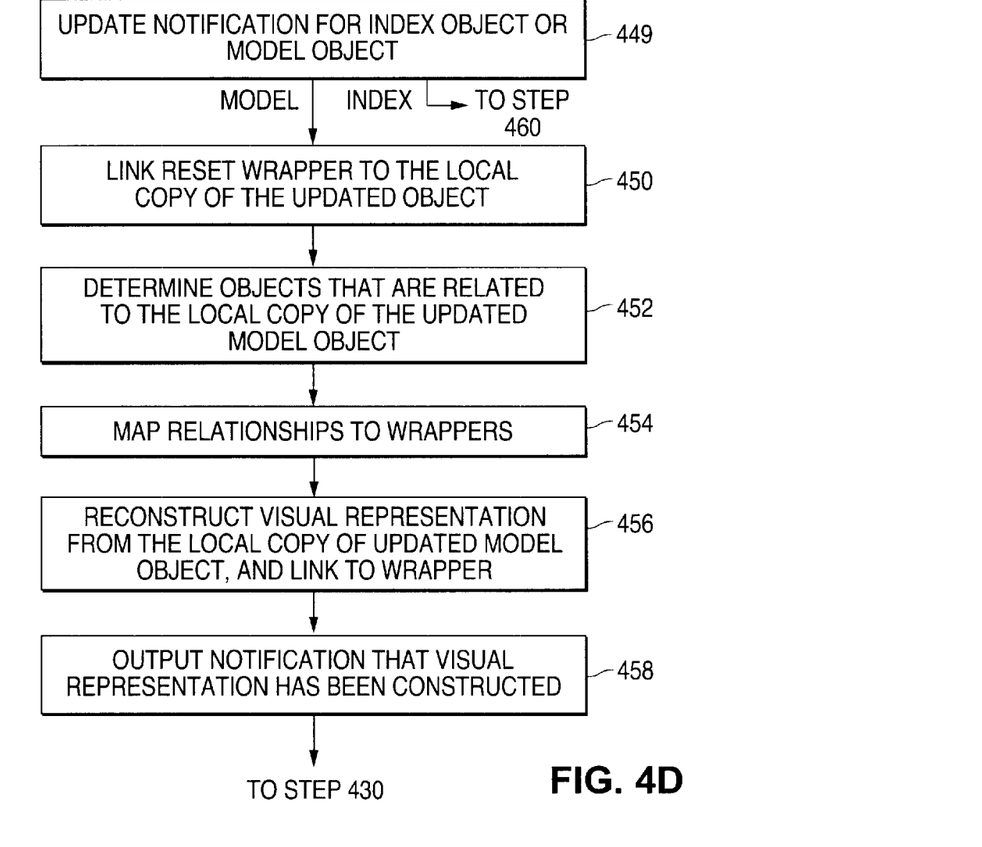
Figure 4E:
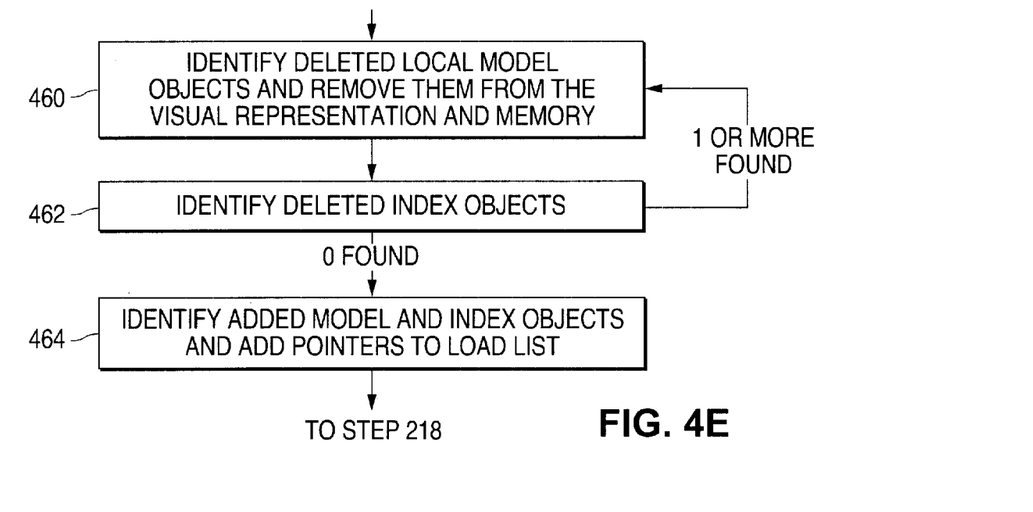
Figure 4F:
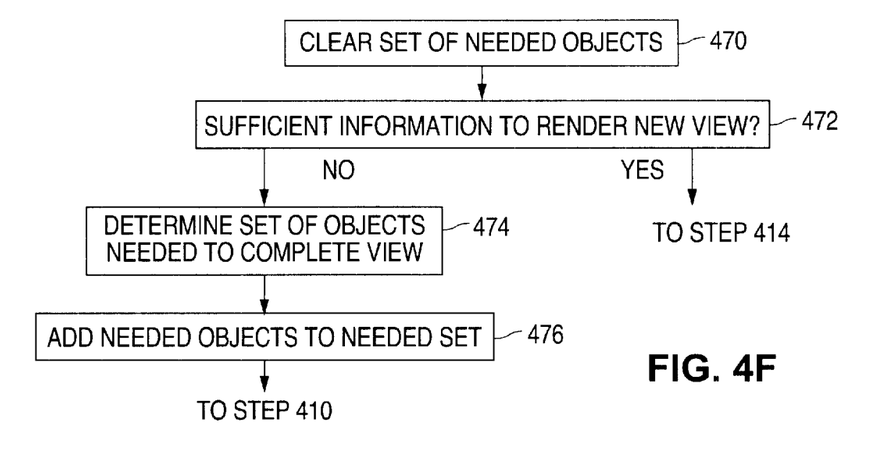

As shown in FIG. 4A, model thread 400 begins at step 410 by generating a first wrapper that corresponds with the first index object which is loaded in step 312 of load thread 300. A wrapper, in turn, is a structure that maintains local viewer information regarding the object.

Following this, model thread 400 moves to step 412 to determine whether a notification has been received. If a notification has not been received, model thread 400 waits in step 412 until a notification is received. When a notification is received, model thread 400 moves to step 414 to determine the type of notification received. If the notification is from load thread 300, such as when load thread 300 reports at step 314 that the first index object has been loaded, model thread moves to step 416 to link the first wrapper to the local copy of the first index object.

Following this, model thread 400 moves to step 418 to expand the first wrapper. The first wrapper is expanded by determining the number of second objects which are related to the first index object that are encoded in the local copy of the first index object. As previously mentioned, this determination depends on the desired view and the additional reference information encoded in the first object. Next, model thread 400 moves to step 420 to generate second wrappers for the second objects. Following this, model thread 400 moves to step 422 where the relationships between the first object and the second objects are mapped to be relationships between the first and second wrappers.

Once the relationships have been mapped to the wrappers, model thread 400 moves to step 424 where pointers that represent the second objects are then added to the needed set of objects. As noted above, this condition causes load thread 300 to loop through steps 316–320 to load the objects.

Next, model thread 400 moves to step 425 to determine if the first index object has a visual representation. In general, model objects have visual representations and index objects do not, but there are some exceptions depending on the view mode and type of the model objects. If the first index object does not have a visual representation, model thread 400 moves to step 430 to determine if a notification has been received.

If the first index object has a visual representation, model thread 400 moves to step 426 to further expand the first wrapper. The first wrapper is further expanded by constructing a visual representation of the local copy of the first index object, and linking the visual representation to the first wrapper. Once the visual representation has been constructed, model thread 400 moves to step 428 to output a notification that a visual representation has been constructed.

Following this, model thread 400 moves to step 430 to determine if another notification has been received. When a notification has not been received, model thread 400 waits at step 430 until a notification is detected. When a notification is received, model thread 400 moves to step 432 to determine the type of notification received. If the notification is from load thread 300, such as when load thread 300 reports at step 320 that the second (additional) objects have been loaded, model thread 400 moves to step 434.

In step 434, the second wrappers are linked to the local copies of the now-loaded second objects. Following this, model thread 400 moves to step 436 to expand the second wrappers. The second wrappers are expanded by determining if third objects, which are related to the second objects, are encoded in the local copies of the second objects.

If third objects are not encoded, model thread 400 moves to step 444. On the other hand, if third objects are encoded in the local copies, model thread 400 moves to step 438 to generate third wrappers for the third objects. Following this, model thread 400 moves to step 440 where the relationships between the second objects and the third objects are mapped to be relationships between the second and third wrappers.

Once the relationships have been mapped to the wrappers, model thread 400 moves to step 442 where pointers which represent the third objects are added to the needed set of objects. As noted above, this condition causes load thread 300 to loop through steps 316–320 to load the next group of related objects.

Next, model thread 400 moves to step 444 to determine if any of the second objects are model objects. If not, model thread 400 moves to step 430 to await a next notification. If a number of the second objects are model objects, method 400 moves to step 446 to further expand the second wrappers. The second wrappers are further expanded by constructing visual representations of the local copies of the second model objects, and linking to the visual representations to the second wrappers.

Once the visual representations have been constructed, model thread 400 moves to step 448 to output a notification that visual representations have been constructed. Following this, model thread 400 moves to step 430 to determine if another notification has been received. When a notification has not been received, model thread 400 waits at step 430 until a notification is detected. When a notification is received from load thread 300, the process continues as described above.

Figure 5:
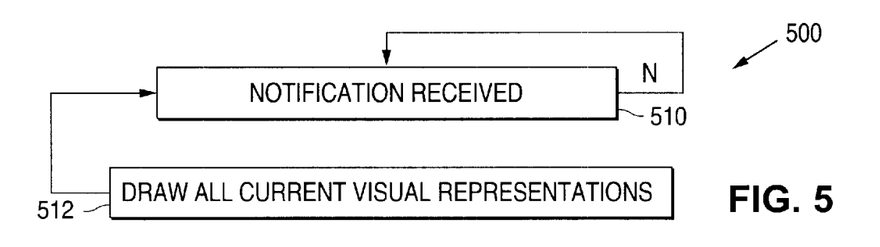
FIG. 5 is a flow chart illustrating a render thread 500 in accordance with the present invention.

As noted above, method 200-A utilizes three interrelated threads, a load thread, a model thread, and a render thread, to generate the view. FIG. 5 shows a flow chart that illustrates a render thread 500 in accordance with the present invention. Render thread 500 implements step 216 of method 200-A. Note that this configuration and number of thread is just one possible embodiment of the invention (e.g., the invention could be implemented with just one thread per computer).

As shown in FIG. 5, render thread 500 begins at step 510 by determining whether a visual notification has been received. If a visual notification has not been received, render thread 500 waits in step 510 until a notification is received. When a visual notification is received, render thread 500 moves to step 512 to draw all current visual representations. Following this, render thread 500 returns to step 510 to wait for the next notification.

Figure 6:
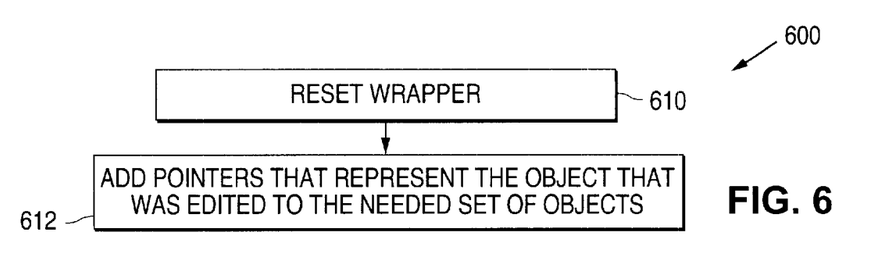
FIG. 6 is a flow chart illustrating a method 600 for processing the edit and outputting the update instruction in accordance with the present invention.

As noted above, method 200-A processes edit notifications in step 220. FIG. 6 shows a flow chart that illustrates a method 600 for processing the edit notification in accordance with the present invention. Method 600 implements step 220.

As shown in FIG. 6, method 600 begins at step 610 by resetting (collapsing) the wrapper of the object that was edited to set the wrapper back to the state that existed prior to the object being linked to the local copy of the object. Thus, all local information attached to the wrapper is deleted, including the local copy of the model object, as though the wrapper had never been loaded. Next, method 600 moves to step 612 where pointers that represent the object that was edited are added to the needed set of objects. As a result, the model or index object that was edited is reloaded as though it had never been loaded.

Figure 7:
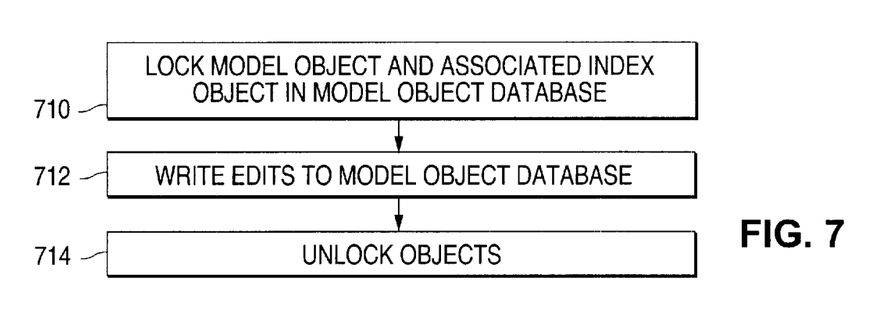
FIG. 7 is a flow chart illustrating a method 700 for updating a model object in the model object database in accordance with the present invention.

As noted above, method 200-B illustrates the operation of database computer 106. FIG. 7 shows a flow chart that illustrates a method 700 for updating a model object in the model database in accordance with the present invention. Method 700 implements step 252 of method 200-B.

As shown in FIG. 7, method 700 begins at step 710 by locking the model object and the associated index object in the model database after the instruction in step 250 has been received. After the objects have been locked, method 700 moves to step 712 to write the editing changes to the model database. Following this, method 700 moves to step 714 to unlock the objects. Once the objects have been unlocked, method 700 moves to step 254 of method 200-B where the update notification is issued.

When an update notification is received from computer 106 in step 218, and the update notification indicates that a model object was updated in step 222, method 200-A moves to step 224 where computer 102 loads the updated model object to form an updated local model object in response to the update notification from computer 106. Steps 316–320 of model thread 300 can be used to implement step 224. After step 224, method 200-A moves to step 226 to reconstruct a visual representation from the updated local model object. Model thread 400 also implements step 226.

As shown in FIGS. 4A–4F, when a notification is received in steps 412 and 430, model thread 400 moves to steps 414 and 432, respectively, to determine the type of notification received. When an update notification is received, model thread 400 moves to step 449 to determine if the update notification is for a model object or an index object. If for a model object, model thread 400 moves to step 450 to link the reset wrapper to the local copy of the updated object.

Next, model thread 400 moves to step 452 to expand the reset wrapper to determine the objects that are related to (encoded in) the local copy of the updated model object. Following this, model thread 400 moves to step 454 where the relationships between the updated model object and its related objects are mapped to be relationships between the reset wrapper and its related wrappers.

Once the relationships have been mapped to the wrappers, model thread 400 moves to step 456 to construct a visual representation from the local copy of the updated model object, and link the visual representation to the wrapper. Once the visual representation has been constructed, model thread 400 moves to step 478 to output a notification that a visual representation has been constructed. Following this, model thread 400 moves to step 430 of model thread 300.

When a visual notification is received, method 200-A moves to step 228 to redisplay the selected view. Render thread 500 can also implement step 228. As a result, the change made to the model object is reflected in an updated view moments after the changed objects in the database have been unlocked.

On the other hand, when an update notification is received from computer 106 in step 218, and the update notification indicates that an index object was updated in step 222, method 200-A moves to step 230 where computer 102 loads the updated index object to form an updated local index object in response to the update notification from computer 106. Steps 316–320 of model thread 300 can be used to implement step 230. After step 230, method 200-A moves to step 232 to compare the updated local index object with the previous state of the local index object, and process the differences. Model thread 400 also implements step 232.

As shown in FIGS. 4A–4F, when a notification is received in steps 412 and 430, model thread 400 moves to steps 414 and 432, respectively, to determine the type of notification received. When an update notification is received, model thread 400 moves to step 449 to determine if the update notification is for a model object or an index object. If for an index object, model thread 400 moves to step 460 where computer 102 checks the updated local index object against the previous state of the local index object for deleted references to model objects. If any deleted model object references are found, computer 102 removes these local model objects from memory and removes their visual representation as well.

Computer 102 then moves to step 462 where it checks the updated local index object against the previous state of the local index object for deleted references to other index objects. If any deleted index object references are found, computer 102 moves to step 460 while noting that the updated copy of the deleted index object has no references. Once computer 102 has removed all descendant index and model objects from the deleted index objects, computer 102 moves to step 464 where it checks the updated local index object against the previous state of the local index object for newly added references to model or index objects. For each added index and model object, computer 102 adds these references to the list of objects to load from the database and moves to step 218. Load thread 300 then proceeds to load requested objects from the database to make local objects.

As noted above, to select a model to work on, the user selects the root index object and a view of the model. The selection of the root index object and view initializes method 200-A to generate a displayed image, and causes each of the model objects of interest in the specified view to be converted to visual representations and displayed via display system 116. The user can then wait until method 200-A completely finishes reconstruction of the view, or can edit one of the visual representations of a model object in the display, or can change the specified view. Either of the latter two operations can be done at any time, even before the view is completely reconstructed.

As shown in FIGS. 4A–4F, when a notification is received in steps 412 and 430, model thread 400 moves to steps 414 and 432, respectively, to determine the type of notification received. If a view change notification is detected, model thread 400 moves from step 414 or 432 to step 470 to clear the needed set of objects. Once the needed set of objects has been cleared, model thread 400 moves to step 472 to determine whether the new view is complete with respect to the set of objects which have so far been completely loaded and had visual representations created. If the view is complete, model thread 400 returns to steps 414. If the view is incomplete, model thread 400 proceeds to step 474, which initializs the needed set of objects with a pointer that identifies the set of as-yet unexpanded index and model objects that correspond with the missing portions of the new view.

The initialization, in turn, causes load thread 300 to move to step 312 to load the first object. After the needed set of objects has been initialized, model thread 400 moves to step 410 to generate a first wrapper for the first object.

Thus, a system and method have been described that allow a number of users to work on any element of a model at any time, even one that was being edited moments before by another user. There are no explicit partitions of the model. With this system and method, model objects added to the model by one user will automatically be made visible to users viewing the same model on another computer. Likewise, model objects deleted from the model by one user will automatically removed from the view of users viewing the same model on another computer. In the present invention, the model objects that need to be loaded are identified from either 1) the index objects that have been loaded, 2) the user changing the view, or 3) the editing procedure.

The above-described view and edit methods are conceptually distinct. The methods can be on the same or different computers, and can constitute different editing sessions to the user. The user interacts with view windows which are a composite including one view method (displaying into the window) and zero or more editing methods. Each user may be interacting with several windows, open to different viewpoints, at the same time on the same machine.

One of the advantages of the present invention is that the present invention automatically prevents resource and editing conflicts between users. The conflicts are prevented because updates of the model views for each user are handled as changes are made, ensuring that each user's view is up-to-date within seconds on any change, and are locked on an object-by-object basis, where the locking prevents two users from editing the same specific model object at the same time.

Another advantage of the present invention is that the only references that are explicitly maintained between the objects are those maintained between the wrappers. The wrappers are never destroyed unless the objects the wrappers are linked to are destroyed in the model database. As a result, the present invention results in a local representation of the database that is at all times consistent, without dangling references.

In addition, sequencing issues can be avoided by using wrapper references rather than direct object references. When change notifications are received, only those portions of the model that actually change are reloaded via the collapse and subsequent relinking and reexpansion of their wrappers. Further, since changes in the model database produce such a tightly bound amount of work in each viewer means that the viewer can be updated continuously as changes come in.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A system for concurrently modeling any element of a model, the system comprising:

a first computer having a database, the database having a plurality of objects that define the model, the plurality of objects including model objects and index objects;

second computer connected to the first computer, the second computer having:

means for loading a number of objects from the database into the second computer to form a corresponding number of local objects, the local objects including local index objects and local model objects;

means for constructing a plurality of visual representations from the local model objects, each visual representation being constructed from a corresponding local model object;

means for displaying a selected view of the model on a display, the selected view including a number of visual representations;

means for editing a visual representation of a local object to define a change to the local object, the means including means for editing a visual representation of a local model object to define a change to the local model object;

means for instructing the first computer to update the object stored in the database that corresponds with the local object that was edited to form an updated object in the database that reflects the change made to the local object, the means including means for instructing the first computer to update the model object stored in the database that corresponds with the local model object that was edited to form an updated model object in the database that reflects the change made to the local model object;

means for loading into the second computer the updated object to form an updated local object in response to an update notification, the means including means for loading into the second computer the updated model object to form an updated local model object in response to the update notification;

means for constructing a visual representation from the updated local model object to form a reconstructed visual representation; and means for redisplaying the selected view of the model on the display as a redisplayed view, the redisplayed view including the reconstructed visual representation.

2. The system of claim 1 wherein the means for loading a number of objects includes:

means for initializing a needed set of objects with a pointer that identifies a first index object of an index structure of a root index object of the model;

means for loading the first index object identified by the pointer in the needed set of objects, the first index object being loaded into the second computer from the database as a local first index object;

means for outputting a load notification which indicates that the first index object has been loaded;

means for determining if the needed set of objects is empty;

means for loading a number of additional objects identified by pointers in the needed set of objects when the needed set of objects is not empty, the additional objects being loaded into the second computer from the database as local additional objects; and means for outputting a load notification to indicate that additional objects have been loaded.

3. The system of claim 2 wherein the means for loading a number of objects further includes:

means for generating a first wrapper that corresponds with the first index object;

means for linking the first wrapper to the local first index object when the load notification indicates that the first index object has been loaded;

means for determining a number of second objects that are encoded in the first index object;

means for generating a number of second wrappers that correspond with the number of second objects; and means for identifying pointers that represent the second objects, and adding the pointers to the needed set of objects.

4. The system of claim 3 wherein the second objects are loaded as local second objects, and further comprising:

means for linking the second wrappers to the local second objects when the load notification indicates that the second objects have been loaded;

means for determining if a number of third objects are encoded in local second objects;

means for generating a number of third wrappers for the third objects that are encoded in local second objects;

means for identifying pointers that represent the third objects when third objects are encoded in the local second objects, and adding the pointers to the needed set of objects;

means for determining if any of the local second objects are model objects;

means for constructing visual representations of local second objects that are model objects; and means for outputting a visual notification that a visual representation has been constructed.

5. The system of claim 4 wherein the means for displaying a selected view of the model on a display include:

means for determining if a visual notification has been received; and means for drawing all current visual representations when a visual notification is received.

6. The system of claim 2 and further comprising:

means for clearing the needed set of objects when a view notification is detected;

means for determining if sufficient information to render a new view is present;

means for determining a set of objects needed to complete the new view when sufficient information is not present; and means for adding pointers for the set of objects needed to complete the new view to the needed set of objects.

7. The system of claim 1 wherein the means for editing includes:

means for resetting a wrapper linked to the local object that was edited to form a reset wrapper; and means for adding pointers that represent the local object that was edited to the needed set of objects.

8. The system of claim 7 and further comprising:

means for linking the reset wrapper to the updated local object;

means for determining a number of objects that are related to the updated local object;

means for constructing a visual representation from the updated local object when the updated local object is a model object; and means for outputting a visual notification when a visual representation is formed from the updated local object.

9. The system of claim 1 wherein the first computer includes:

means for detecting an update instruction;

means for updating a model object stored in the database in response to the update instruction; and means for outputting an update notification that the database has been updated.

10. The system of claim 9 wherein the means for updating include:

means for locking an object in the database;

means for writing edits to the object in the database; and means for unlocking the object in the database.

11. The system of claim 10 and further comprising:

means for generating a first wrapper that corresponds with the first index object;

means for linking the first wrapper to the local first index object when the load notification indicates that the first index object has been loaded;

means for determining a number of second objects that are encoded in the local first index object;

means for generating a number of second wrappers that correspond with the number of second objects; and means for identifying pointers that represent the second objects, and adding the pointers to the needed set of objects.

12. The system of claim 11 wherein the second objects are loaded as local second objects, and further comprising:

means for linking the second wrappers to the local second objects when the load notification indicates that the second objects have been loaded;

means for determining if a number of third objects are encoded in local second objects;

means for generating a number of third wrappers for the third objects that are encoded in local second objects;

means for identifying pointers that represent the third objects when third objects are encoded in the local second objects, and adding the pointers to the needed set of objects;

means for determining if any of the local second objects are model objects;

means for constructing visual representations of local second objects that are model objects; and means for outputting a visual notification that a visual representation has been constructed.

13. The system of claim 1 wherein the means for loading into the second computer the updated object includes means for loading into the second computer an updated index object to form an updated local index object in response to the update notification.

14. The system of claim 13 and further comprising means for comparing the updated local index object with a state of a previous local index object, and processing the differences.

15. The apparatus of claim 1 and further comprising means for updating a spatial index on the first computer to accommodate a change in a local model object or the addition/deletion of a local model object, and propagation of the updated spatial index to the second computer.

16. A system for loading a number of objects of a model, the system includes:

means for initializing a needed set of objects with a pointer that identifies a first index object of an index structure of a root index object of the model;

means for loading the first index object identified by the pointer in the needed set of objects, the first index object being loaded into a computer from a database as a first index object;

means for outputting a load notification which indicates that the first index object has been loaded;

means for determining if the needed set of objects is empty;

means for loading a number of additional objects identified by pointers in the needed set of objects when the needed set of objects is not empty, the additional objects being loaded into the second computer from the database as local copies of the additional objects; and means for outputting a load notification to indicate that additional objects have been loaded.

17. A method for concurrently modeling any element of a model, the model having a plurality of objects stored in a database of a first computer, the method including the steps of:

loading a number of objects from the database into a second computer to form a corresponding number of local objects, the local objects including local index objects and local model objects;

constructing a plurality of visual representations from the local model objects, each visual representation being constructed from a corresponding local model object;

displaying a selected view of the model on a display, the selected view including a number of visual representations.

editing a visual representation of a local object to define a change to the local object, the step including the step of editing a visual representation of a local model object to define a change to the local model object;

instructing the first computer to update the object stored in the database that corresponds with the local object that was edited to form an updated object in the database that reflects the change made to the local object, the step including the step of instructing the first computer to update the model object stored in the database that corresponds with the local model object that was edited to form an updated model object in the database that reflects the change made to the local model object;

loading into the second computer the updated object to form an updated local object in response to an update notification, the step including the step of loading into the second computer the updated model object to form an updated local model object in response to the update notification;

constructing a visual representation from the updated local model object to form a reconstructed visual representation; and redisplaying the selected view of the model on the display as a redisplayed view, the redisplayed view including the reconstructed visual representation.

18. The method of claim 17 wherein the step of loading a number of objects includes the steps of:

initializing a needed set of objects with a pointer that identifies a first index object of an index structure of a root index object of the model;

loading the first index object identified by the pointer in the needed set of objects, the first index object being loaded into the second computer from the database as a local first index object;

outputting a load notification which indicates that the first index object has been loaded;

determining if the needed set of objects is empty;

loading a number of additional objects identified by pointers in the needed set of objects when the needed set of objects is not empty, the additional objects being loaded into the second computer from the database as local additional objects; and outputting a load notification to indicate that additional objects have been loaded.

19. The method of claim 18 wherein the step of loading a number of objects further includes the steps of:

generating a first wrapper that corresponds with the first index object;

linking the first wrapper to the local first index object when the load notification indicates that the first index object has been loaded;

determining a number of second objects that are encoded in the first index object;

generating a number of second wrappers that correspond with the number of second objects; and identifying pointers that represent the second objects, and adding the pointers to the needed set of objects.

20. The method of claim 19 wherein the second objects are loaded as local second objects, and further comprising the steps of:

linking the second wrappers to the local second objects when the load notification indicates that the second objects have been loaded;

determining if a number of third objects are encoded in local second objects;

generating a number of third wrappers for the third objects that are encoded in local second objects;

identifying pointers that represent the third objects when third objects are encoded in the local second objects, and adding the pointers to the needed set of objects;

determining if any of the local second objects are model objects;

constructing visual representations of local second objects that are model objects; and outputting a visual notification that a visual representation has been constructed.

21. The method of claim 17 and further comprising the steps of:

detecting an update instruction;

updating a model object stored in the database in response to the update instruction; and outputting an update notification that the database has been updated.

22. The method of claim 21 wherein the step of updating includes the steps of:

locking an object in the database;

writing edits to the object in the database; and unlocking the object in the database.

23. The method of claim 17 wherein the step of loading into the second computer the updated object includes the step of loading into the second computer an updated index object to form an updated local index object in response to the update notification.

24. The method of claim 23 and further comprising the step of comparing the updated local index object with a state of a previous local index object, and processing the differences.

25. A method for loading a number of objects of a model, the method including the steps of:

initializing a needed set of objects with a pointer that identifies a first index object of an index structure of a root index object of the model;

loading the first index object identified by the pointer in the needed set of objects, the first index object being loaded into a computer from a database as a first index object;

outputting a load notification which indicates that the first index object has been loaded;

determining if the needed set of objects is empty;

loading a number of additional objects identified by pointers in the needed set of objects when the needed set of objects is not empty, the additional objects being loaded into the second computer from the database as local copies of the additional objects; and outputting a load notification to indicate that additional objects have been loaded.

26. A method for concurrently modeling objects of a geometric model, comprising:

storing the geometric model in a database of a first computer as a number of model objects;

creating a local object on a second computer by loading a copy of a model object of the geometric model to the second computer;

generating a visual representation of the local object on a display of the second computer;

editing the local object, wherein the edits to the local object change the visual representation of the local object;

saving the edits done to the local object, as changes in the model object stored in the database of the first computer; and notifying a computer displaying a local object which corresponds to the model object that a change has been to the model object, and in response to the notification the computer displaying the local object loads a new local object which incorporates the edits to the model object stored in the database of the first computer.

27. A system for incrementally loading objects from a geometric model that satisfy specific spatial or semantic criteria, the system comprising:

a first computer having a database, the database having a plurality of objects that define a geometric model, the plurality of objects including model objects and index objects, the first computer operable to make changes to objects in response to communications from any one of a plurality of client computers, and to send a notification to one or more of the plurality of client computers when a change is made to an object;

a network connecting the first computer to the plurality of client computers, such that the client computers can access the database; and at least one of the plurality of client computers operable to load a root index object, and operable to asynchronously perform load iterations, where a load iteration includes using the already loaded index objects, applying a specified spatial or semantic query to determine a set of new objects that need to be loaded, determining if the set of objects to load is non-empty and then loading objects of the set of objects that are not write-locked, at least one of the plurality of computers further operable to receive notification of object change from the first computer, and upon receipt of notification operable to delete the local copy of the modified object and to modify an index structure to show the object is no longer loaded.

* * * * *